United States Patent [19]

Weber

[11] 4,363,532

[45] Dec. 14, 1982

[54] AUTOMATIC SUBSTAGE ILLUMINATION FOR MICROSCOPES

[75] Inventor: Klaus Weber, Königsbronn, Fed. Rep. of Germany

[73] Assignee: Carl Zeiss-Stiftung, Oberkochen, Fed. Rep. of Germany

[21] Appl. No.: 208,042

[22] Filed: Nov. 18, 1980

[30] Foreign Application Priority Data

Nov. 21, 1979 [DE] Fed. Rep. of Germany ....... 2946927

[51] Int. Cl.$^3$ ............................................. G02B 21/06
[52] U.S. Cl. .................................................. 350/523
[58] Field of Search ........................ 350/87, 88, 89, 90

[56] References Cited

U.S. PATENT DOCUMENTS

| | | | |
|---|---|---|---|
| 2,264,835 | 12/1941 | Flint | 350/87 |
| 2,977,848 | 4/1961 | Malfeld | 350/87 |
| 3,679,287 | 7/1972 | Takahashi et al. | 350/87 |

FOREIGN PATENT DOCUMENTS 640722 7/1950 United Kingdom .................. 350/87

*Primary Examiner*—John K. Corbin
*Assistant Examiner*—Matthew W. Koren
*Attorney, Agent, or Firm*—Hopgood, Calimafde, Kalil, Blaustein & Judlowe

[57] ABSTRACT

Automatic substage illumination for microscopes which consists of a stop turret which is mechanically coupled with the lens turret. Field stops and aperture stops adapted to the lens components are arranged below the stage of the microscope in replaceable manner, each on a separate disk, and upon the switching of the lens turret they are moved along by a rotary knob arranged on the outside of the microscope. The aperture-stop turret is located directly in the rear focal plane of the condenser and in at least one switched position bears an auxiliary lens upon the advancing of which the focal length of the condenser is changed so that large object fields can also be illuminated.

Special diaphragms (annular diaphragms, central diaphragms, polarizers, etc.) for the different contrasting methods are arranged in centerable manner on a slide in the stage. An aperture iris diaphragm serves as additional contrasting means for bright-field operation.

9 Claims, 3 Drawing Figures

AUTOMATIC SUBSTAGE ILLUMINATION FOR MICROSCOPES

The present invention relates to a device for automatically controlling the operating parameters of a substage illumination system for microscopes.

In order to produce optimum conditions of illumination, such as are necessary for microscopy with the highest possible contrast and power of resolution, it is necessary, in accordance with Köhler's principle, that the object be illuminated with a size of illuminated field and aperture adapted to the objective used for the observation. The setting work necessary to satisfy this principle requires additional manipulations upon each change in objective.

It has therefore already been attempted for some time to create illuminating devices which are automatically also switched, upon a change in objective, all of which devices however, are rather expensive and costly and therefore cannot be realized in a low-cost, routine microscope the circle of users of which would particularly profit from this reduction in the work.

From West German Provisional Pat. No. 1 807 786 it is known to simplify the adjustment of the illumination by the use of a turret condenser, and in U.S. Pat. No. 3,679,287 a motion coupling between a turret condenser and the lens turret is proposed.

Condensers, however, consist of a plurality of lens members which must be produced and centered accurately. Since they are furthermore arranged in the direct vicinity of the specimen below the stage of the microscope, a turret condenser requires a costly mechanism by which the condenser is lowered upon the change, or the stage must be moved away for the swinging out of the condenser. If the stage is developed as a mechanical stage, undesired limiting additional conditions for the guide paths thereof result in the latter case.

It is also known to swing auxiliary lenses into the illuminating system (West German Unexamined Application for Pat. No. 2 116 625) and to effect the swinging in and out of the auxiliary lenses by an electric drive which is controlled via a signal transmitter which scans a characteristic of the objectives (West German Unexamined Application for Pat. No. 2 846 655). Another device employs switches which are actuated upon the turning of the lens turret in order, by means of an electric motor, to displace parallel to the optical axis a lens member which is arranged in the path of the illumination beam (West German Provisional Pat. No. 2 219 521).

Such transmission systems between lens turret and illumination system are costly and expensive and not only so because of the use of electric drives. The accurate precise positioning of a large number of lens members in order to change the focal length of the illumination system requires precisely manufactured guideways and a high expense for adjustment upon manufacture.

West German Unexamined Application for Pat. No. 2 644 341 describes a device for the automatic adjustment of an illuminating system which employs motors controlled by measurement of the quantity of light in the image plane for the continuous adjustment of two iris diaphragms which operate as aperture and field stops. This device is also costly and expensive due to the use of at least two motors with the corresponding gears, control electronics, current supply, etc. Furthermore, the possibility cannot be excluded that the properties of the specimens to be examined will have an undesired influence on the function of the arrangement.

In AT-PS No. 167 069 there is described an automatic illumination, both for transillumination and for reflected-light, in which a diaphragm turret is connected by a shaft with the lens turret and thereby coupled mechanically for movement with the latter. The aperture stops in the case of this known illuminating device are, to be sure, swung, seen from the source of light, in front of the field stops into a plane which is conjugated to the rear focal plane of the condenser, and an intermediate image thereof is formed by lenses mounted in the field stops. The known device has the disadvantage, on the one hand, that the rigid coupling between lens turret and stop turret excludes vertical adjustment of the lens turret for purposes of focusing. On the other hand, the setting of very large illuminated fields such as required in the case of small magnification (magnifier magnification) is not possible since constant imaging ratios exist between field stop and object field in all turret positions.

The object of the present invention is to create a device for automatically controlling the operating parameters of a substage illumination system which is characterized by a simple economical construction while avoiding functional limitations.

Starting from an illuminating device in accordance with the preamble, this object is achieved in accordance with the body of the Main Claim by the fact that the turret which bears the aperture stops is arranged following in the direction of light the stop turret which bears the field stops, in the direct vicinity of the rear focal plane of the condenser and bears an auxiliary lens in at least one switched position.

The solution in accordance with the invention has the advantage over the known illuminating device with mechanical coupling of stop and lens turrets that very large object fields can also be illuminated. With the auxiliary lens arranged on the aperture-stop turret the scale with which the field stop is imaged in the object plane can, namely, be changed, and thus the bundle cross-section of the illuminating beam can always be kept sufficiently small.

It is advantageous to develop the aperture and field stop turrets in the form of turnable disks and arrange them on a common drive shaft in order to achieve a particularly simple construction of the system. The necessary turning motion upon change of the stop can be derived without difficulty from the turning movement of the lens turret.

The stops are advisedly inserted in replaceable manner in the turret so as to adapt the illuminating system, without great expense, to the lens combination desired by the user or to afford him the possibility, upon a change in the components of the lens turret, to himself be able to adjust the illumination system.

In order to permit focusing with stationary stage by vertical adjustment of the lens turret, the mechanical transmission means between the lens and stop turrets advantageously include a shaft which is supported for displacement in the direction of the optical axis and which compensates for the focusing stroke of the movable lens turret with respect to the stationary stop turret.

It is furthermore advisable to arrange an additional iris diaphragm, which is continuously adjustable independently of the turret position, within the aperture plane. In this way it is possible to reduce the illumination for an increase in contrast starting from the value set by the turret.

If the illuminating device is to be made suitable by simple means for the common contrasting methods such as dark-field illumination, phase contrast, or interference contrast, it is advisable to arrange in the immediate vicinity of the aperture stop an additional turret which is actuatable independently of the aperture-stop turret and which contains the central diaphragms, annular diaphragms, etc. necessary for the methods to be carried out, or a polarizer. In order to adapt the picture brightness in bright-field operation, it is advisable to provide a gray filter in the corresponding switch position. These diphragms can also be inserted replaceably in each case in a centerable frame in the auxiliary turret in order to be able to use diaphragms adapted to the ring size in the corresponding lenses or to be able to adjust the annular diaphragms with respect to the phase annuli in the lenses. The additional turret can, for instance, have the shape of a slide on which the diaphragm carriers and the corresponding centering screws are arranged.

In order to be able to check, at all times, whether the condenser is correctly focused, an auxiliary object which can be swung within the plane of the field stop into the ray path is advisable since, in view of the automatic mechanism of the illuminating system, the edge of the field stop is always outside the field of vision. This operation, however, is one of the secondary manipulations which is only necessary when operating with specimen slides which are subject to very large variations in thickness.

The invention will be explained by way of example on basis of the accompanying drawings which show one embodiment of an illuminating system in accordance with the present invention.

Figure 1:
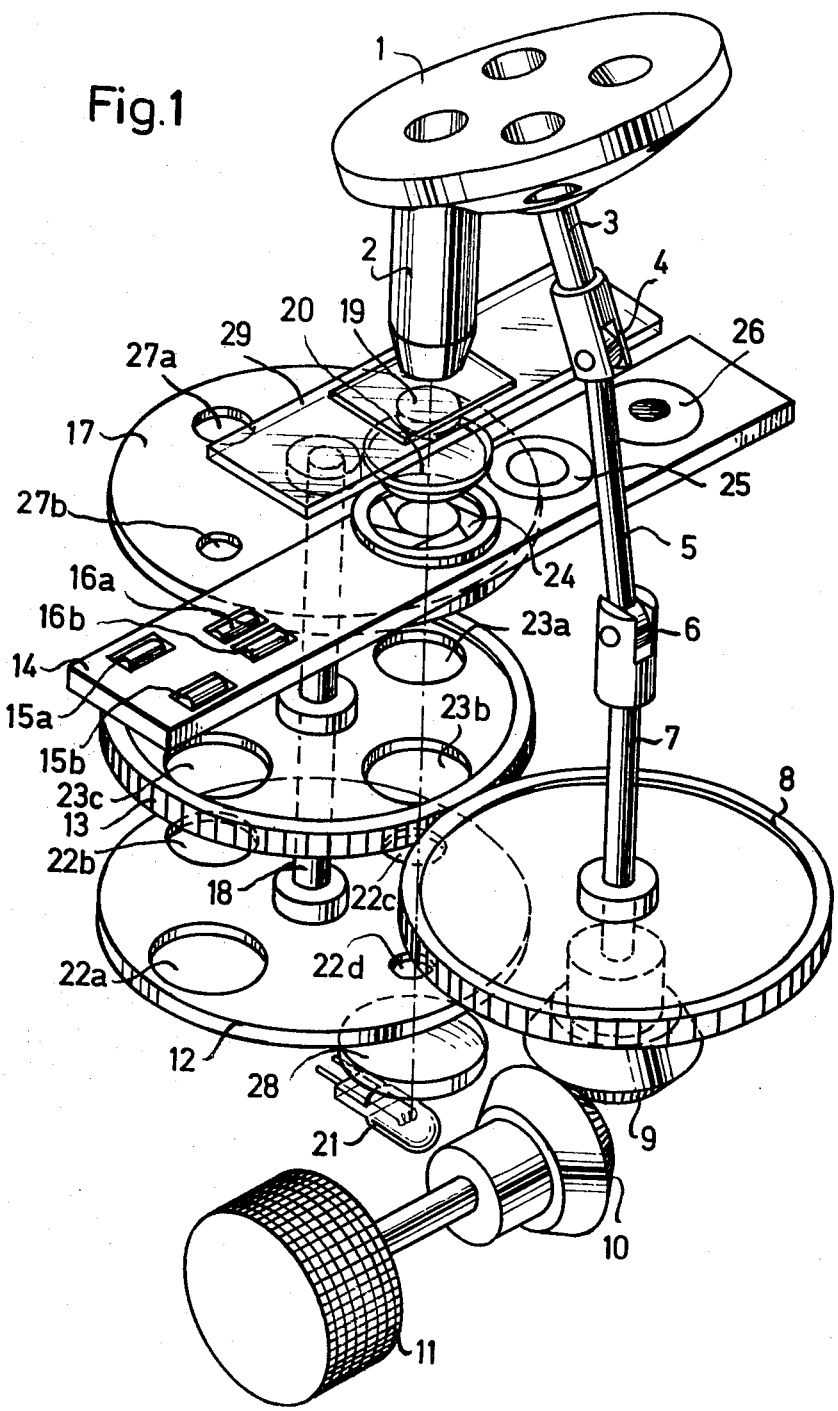
FIG. 1 shows the overall construction, in simplified form, of a substage illumination in accordance with the present invention.

A turret 1 which is connected with the shaft 3 is intended to receive four lenses, of which one lens 2 is shown. The lens turret 1 can be switched into four possible detent positions by an actuating knob 11 via a bevel drive 9, 10 and shafts 5 and 7 connected by joints 4, 6. By means of a spur gearing 8, 13 the field-stop turret 12 and the aperture-stop turret 17 are connected simultaneously with the lens turret 1 via a common shaft 18 which is arranged parallel to the optical axis.

The field-stop turret 12 bears four different field stops 22a, b, c and d, which are matched with four corresponding aperture stops 27 in the turret 17, two of which (27a and b) are shown, to the lenses to be fastened on the turret 1 in accordance with the Köhler illumination principle. In order not to limit the illumination beam, the spur gear has four sufficiently large dimensioned openings 23a–d.

The illumination system contains a lamp 21 for illuminating the specimen slide 29 by means of the collector 28 and the two-element condenser 19, 20. In the immediate vicinity of the aperture stop, there is an additional turret 14 developed as slide which bears, in each case, a central diaphragm 26 for dark-field illumination, an annular (iris) diaphragm 25 for phase contrast and, in the switched position shown, a gray filter (not shown) for reduction of the brightness in case of bright-field illumination. In the inserted condition shown, the adjustment screws 15a and 15b for the centering of the annular diaphragm 25 and the adjustment screws 16a and b for adjusting the central diaphragm 26 are covered and cannot be unintentionally displaced by the user. If, for instance, instead of the annular diaphragm 25 a polarizer is inserted, then the adjustment screws 15a and b are used to adjust the crossover position with respect to a stationary analyzer when the attachment of the adjustable receiving frame for the polarizer or the diaphragm 25 is so designed that a displacement of the frame in the plane of the additional turret 14 by means of the screws 15a and b is accompanied by a simultaneous turning.

Directly above the slide 14, and also still in the immediate vicinity of the aperture plane, there is an iris diaphragm 24 which can be adjusted by actuating means, not shown in the drawing, and can be used as contrasting aid in bright-field operation.

Figure 2:
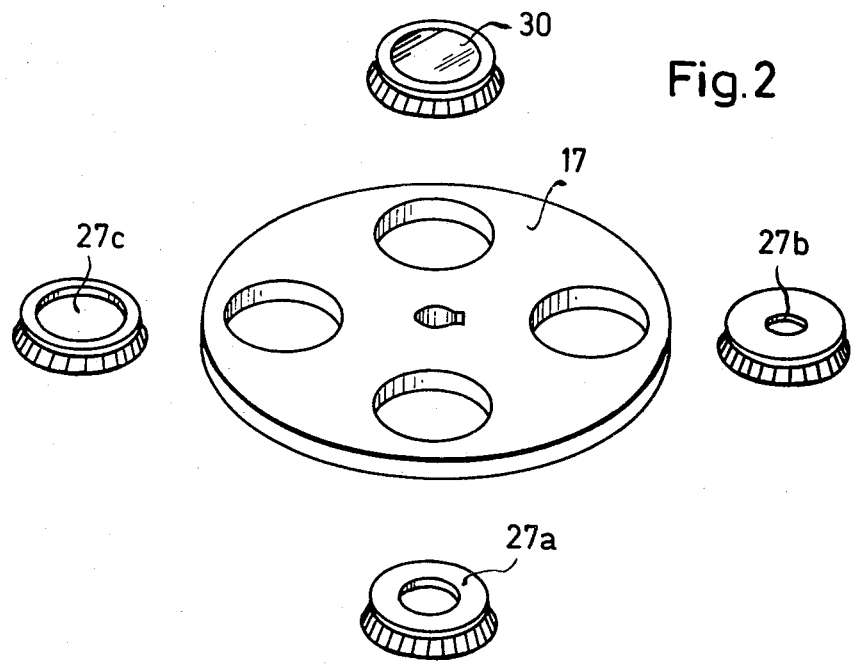
FIG. 2 shows a detailed sketch of the aperture stop turret of FIG. 1.

The aperture-stop turret 17 is again shown in greater detail in FIG. 2. It consists of a disk which has four holes of the same diameter, arranged at an equal distance from its center point. Each of these holes serves to receive three diaphragm inserts 27a, b and c as well as the auxiliary lens 30 by which the focal length of the condenser can be changed. The diaphragm inserts 27a, b and c as well as the mount of the auxiliary lens 30 consist in each case of rings whose outside diameter is larger than the inside diameter of the boreholes in the diaphragm turret 17 and which have a spring shoulder which, after the pushing-in of the diaphragm inserts, holds them in frictional engagement in the boreholes.

Figure 3:
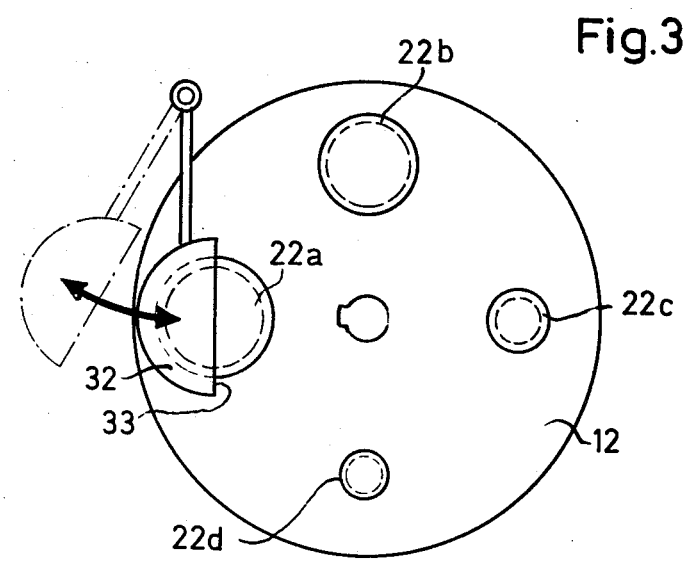
FIG. 3 shows diagrammatically the field-stop turret shown in FIG. 1 with an additional focusing aid for the condenser.

The verification of the correct focusing of the condenser will be again explained with reference to FIG. 3.

In normal operating condition, the edges of the field stops 22a–d are not visible since the coupling between the lens turret and the field-stop turret 12, when correctly equipped, always sees to it that the corresponding fields of vision, indicated by dashed-line circles, lie within the luminous fields. As criterion for the correct focusing of the condenser the contrast of the field-stop limitation is, however, employed. It is reduced now by an auxiliary object 32 which is swung in by the user in the direct vicinity of the field stop by a lever (not shown), i.e. the edge 33 of the auxiliary object 32, after the inward swinging, becomes visible to the user. The condenser can now be accurately focused by setting means (not shown) by the sharp focusing of the limitation 33.

With the illumination device shown, all illumination adjustments which are primarily necessary upon a change in lens are made automatically without major expense. For the lenses arranged in the turret 1, upon the swinging into the imaging ray path there are automatically produced the correct field diameter—it is about 25% greater than the diameter of the corresponding field of vision—and the correct illumination stop—it is between 75% and 95% of the lens stop—when the components on the turrets are adapted to each other. Aside from this, the user is free to use contrasting methods selected by him. With such an illumination device, a low-cost, easily operated routine microscope can be created, for which there has been a long-felt need within large circles of users.

I claim:

1. An improved substage illumination system for microscopes of the type having a stationary condenser, a lens turret for changing objective lens, an aperture stop turret carrying aperture stops and a field stop turret carrying field stops arranged in the illumination ray path, said aperture and field stop turrets being coupled for motion with the lens turret by mechanical transmission means wherein the improvement comprises the aperture stop turret being disposed in the illumination path after the stop turret and disposed directly proximate to the rear focal plane of the condenser, and the aperture stop turret mounting an auxiliary lens for changing the focal length of the condenser in at least one position.

2. The substage illumination system as claimed in claim 1, wherein the aperture stop turret and the field stop turret are constructed and arranged as rotatable disks on a common drive shaft.

3. The substage illumination system as claimed in claim 1, wherein the aperture and field stops are fastened in a replaceable manner on their corresponding turrets.

4. The substage illumination system as claimed in claim 1, wherein the mechanical transmission means include a shaft which is mounted for displacement in the direction of the optical axis.

5. The substage illumination system as claimed in claim 1, further including a continuously variable iris diaphragm disposed in the rear focal plane of the condenser.

6. The substage illumination system as claimed in claim 1, further including an additional turret disposed directly proximate the rear focal plane of the condenser, the additional turret being moveable independently of the aperture-stop turret, the additional turret mounting light modification means.

7. The substage illumination system as claimed in claim 6, wherein said light modification means comprise at least one of a annular diaphragm, a polarizer, a central diaphragm and a gray filter.

8. The substage illumination system as claimed in claim 6, wherein the light modification means are releasably insertable in a centerable frame in the additional turret.

9. The substage illumination system as claimed in claim 1, further including an auxiliary object which is displaceable in the plane of the field stops from a first position out of the ray path to a second position into the ray path to partially cover the field stops.

* * * * *